US009886500B2

(12) United States Patent
George et al.

(10) Patent No.: US 9,886,500 B2
(45) Date of Patent: Feb. 6, 2018

(54) SYSTEM AND METHOD FOR PROVIDING TECHNOLOGY ASSISTED DATA REVIEW WITH OPTIMIZING FEATURES

(71) Applicant: Open Text Holdings, Inc., San Mateo, CA (US)

(72) Inventors: Duane George, Orangevale, CA (US); Douglas Wayne Stewart, San Francisco, CA (US)

(73) Assignee: Open Text Holdings, Inc., San Mateo, CA (US)

( * ) Notice: Subject to any disclaimer, the term of this patent is extended or adjusted under 35 U.S.C. 154(b) by 179 days.

(21) Appl. No.: 14/190,980

(22) Filed: Feb. 26, 2014

(65) Prior Publication Data

US 2014/0280070 A1 Sep. 18, 2014

Related U.S. Application Data

(60) Provisional application No. 61/780,601, filed on Mar. 13, 2013.

(51) Int. Cl.
*G06F 17/30* (2006.01)
(52) U.S. Cl.
CPC .. *G06F 17/30719* (2013.01); *G06F 17/30011* (2013.01)
(58) Field of Classification Search
None
See application file for complete search history.

(56) References Cited

U.S. PATENT DOCUMENTS

| 7,542,970 | B2 * | 6/2009 | Holmes | G06F 17/30864 |
| 8,819,024 | B1 * | 8/2014 | Toderici | G06F 17/30731 |
| | | | | 707/740 |
| 2006/0053174 | A1 * | 3/2006 | Gardner | G06F 17/30707 |
| 2010/0241596 | A1 * | 9/2010 | Lee | G06N 99/005 |
| | | | | 706/11 |
| 2012/0095943 | A1 * | 4/2012 | Yankov | G06N 99/005 |
| | | | | 706/12 |
| 2014/0019113 | A1 * | 1/2014 | Wu | G06F 17/2735 |
| | | | | 704/2 |

OTHER PUBLICATIONS

Cormack et al., Evaluation of Machine-Learning Protocols for Technology-Assisted Review in Electronic Discovery, SIGIR'14, Gold Coast, Queensland, Australia, Jul. 6-11, 2014, pp. 153-162, ACM.

* cited by examiner

*Primary Examiner* — Amresh Singh
(74) *Attorney, Agent, or Firm* — Sprinkle IP Law Group

(57) ABSTRACT

The invention provided is a system configured to use a topic-related generative model to build a document map from a plurality of documents in a storage medium and generate a control set from the plurality of documents including at least two stratified document sets. The system then receives a set of control set metrics regarding the control set from a user. The system selects a machine call responsive document from a document map based on a determined predictive responsiveness for that document. The system receives a responsiveness call from a user through the task/queue framework regarding a machine call document. Finally, the system compares the responsiveness of the machine call document to the control set metrics and rebuilds the document map based on the results of the comparison between the machine call document responsiveness and the control set metrics.

21 Claims, 3 Drawing Sheets

SYSTEM AND METHOD FOR PROVIDING TECHNOLOGY ASSISTED DATA REVIEW WITH OPTIMIZING FEATURES

CROSS REFERENCE TO RELATED APPLICATIONS

This application claims the benefits of U.S. Provisional Application No. 61/780,601, filed on Mar. 13, 2013, the entirety of which is incorporated herein by reference.

COPYRIGHT NOTICE

A portion of this disclosure contains material that is subject to copyright protection. The copyright owner has no objection to the facsimile reproduction by anyone of this patent document as it appears in the U.S. Patent and Trademark Office, patent file or records, but reserves all copyrights whatsoever in the subject matter presented herein.

BACKGROUND

The invention generally relates to systems and methods for technology assisted review of large quantities of data, particularly sets of documents, among other things.

Previously, review of large document sets required hours of labor and training in order to prepare reviewers to sift through documents and identify whether or not a particular document corresponded with the requirements of a search request or demand. The legal industry in particular expends thousands of man-hours every year in the form of e-discovery (the review of large document set for the preparation of legal responses and inquiries during litigation or in connection with a legal matter).

Prior systems used for e-discovery or similar large document set projects primarily focused on the consolidation of the document sets into digital form. This allowed for the quicker production of the document sets during production, as well as faster access and retrieval. Unfortunately, these systems still required extensive human interaction in order to analyze the document set.

Later systems allowed for assisted review through the use of search filters and keyword analysis. These systems would require a user to setup keyword searches that would comb through a document set and then provide those results back to the user. These systems ultimately required significant initial setup time and also led to many "False-positives", or documents that contained the correct keyword but that were not relevant to the scope of the search performed.

Thus, there is a need for systems and methods which resolve one or more of the problems identified above, among other things.

SUMMARY OF INVENTION

In one aspect of the present invention, a data review method is provided. The method includes a system containing a plurality of documents; a storage medium including a relational database; a relational database management system; a distributed file system; a task/queue framework; a messaging framework; a distributed file system parallel processing unit; and a topic-related generative model. The method comprises the steps of: using the topic-related generative model to build a document map of the plurality of documents within the storage medium; generating a control set from the plurality of documents that includes at least two stratified document sets; sending the control set to a user; receiving a set of control set metrics regarding the control set from the user; selecting a machine call responsive document from the document map based on the determined predictive responsiveness; receiving a responsiveness call from a user regarding a machine call document; comparing the responsiveness of the machine call document to the control set metrics; and rebuilding the document map based on the results of the comparison between the machine call document responsiveness and the control set metrics.

In another aspect of the present invention, a system is provided. The system includes a plurality of documents; a storage medium including a relational database; a relational database management system; a distributed file system; a task/queue framework; a messaging framework; a distributed file system parallel processing unit; and a topic-related generative model. The system is configured to use the topic-related generative model to build a document map of the plurality of documents within the storage medium and generate a control set from the plurality of documents that includes at least two stratified document sets. The system then sends the control set to a user through the task/queue framework. The system then receives a set of control set metrics regarding the control set from the user. The system selects a machine-call-responsive document from the document map based on the determined predictive responsiveness. The system receives a responsiveness call from a user through the task/queue framework regarding a machine call document. Finally, the system compares the responsiveness of the machine call document to the control set metrics and rebuilds the document map based on the results of the comparison between the machine call document responsiveness and the control set metrics.

In another aspect of the present invention, a non-transitory information recording medium on which a computer readable program is recorded that causes a computer to function as a system. The system includes a plurality of documents; a storage medium including a relational database; a relational database management system; a distributed file system; a task/queue framework; a messaging framework; a distributed file system parallel processing unit; and a topic-related generative model. The system is further configured to use the topic-related generative model to build a document map of the plurality of documents within the storage medium and generate a control set from the plurality of documents that includes at least two stratified document sets. The system then sends the control set to a user through the task/queue framework. The system then receives a set of control set metrics regarding the control set from the user. The system selects a machine call responsive document from the document map based on the determined predictive responsiveness. The system receives a responsiveness call from a user through the task/queue framework regarding a machine call document. Finally, the system compares the responsiveness of the machine call document to the control set metrics and rebuilds the document map based on the results of the comparison between the machine call document responsiveness and the control set metrics.

BRIEF DESCRIPTION OF THE DRAWINGS

Other advantages of the present invention will be readily appreciated as the same becomes better understood by reference to the following detailed description when considered in connection with the accompanying drawings.

DETAILED DESCRIPTION OF INVENTION

With reference to the drawings and in operation, the present invention overcomes at least some of the disadvantages of known prior art by providing a method of implementing machine driven review of documents. The method includes a system containing a plurality of documents; a storage medium including a relational database; a relational database management system; a distributed file system; a task/queue framework; a messaging framework; a distributed file system parallel processing unit; and a topic-related generative model. The method comprises the steps of: using the topic-related generative model in order to build a document map of the plurality of documents within the storage medium; generating a control set from the plurality of documents that includes at least two stratified document sets; sending the control set to a user; receiving a set of control set metrics regarding the control set from the user; selecting a machine-call-responsive document from the document map based on the determined predictive responsiveness; receiving a responsiveness call from a user regarding a machine call document; comparing the responsiveness of the machine call document to the control set metrics; and rebuilding the document map based on the results of the comparison between the machine call document responsiveness and the control set metrics.

A selected embodiment of the present invention will now be explained with reference to the drawings. It will be apparent to those skilled in the art from this disclosure that the following description of the embodiment of the present invention is provided for illustration only and not for the purpose of limiting the invention as defined by the appended claims and their equivalents.

Referring to the figures, where like numerals generally indicate like or corresponding parts throughout the several views, a system 110 and a method 220 are constructed in accordance with the invention and configured for providing technology assisted data review with optimizing features, among other things.

System Generally

Figure 1:
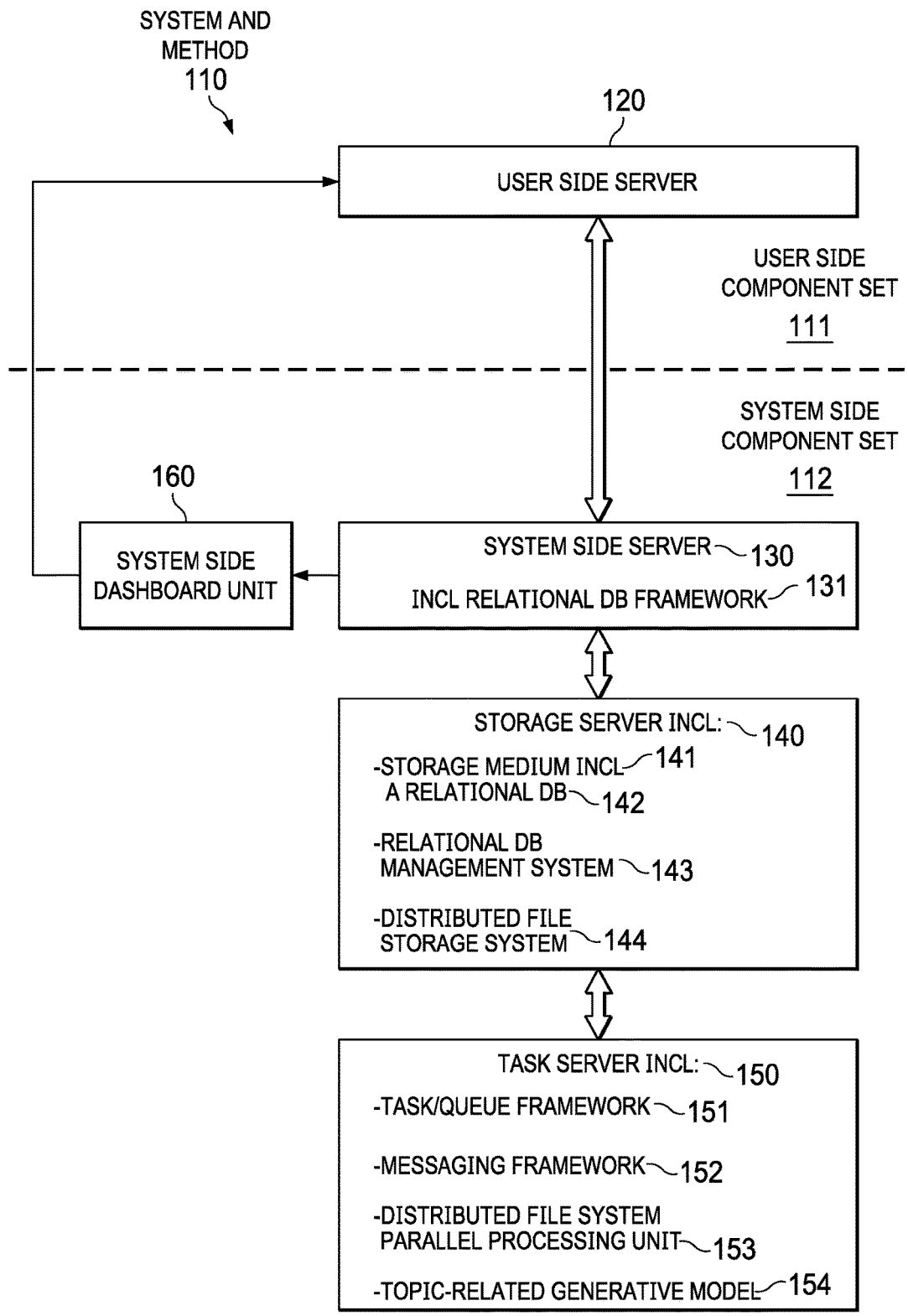
FIG. 1 is a diagram drawing of the system comprising the invention, according to an embodiment of the present invention.

Referring to FIG. 1 the system 110 comprises a user side component set 111 and a system side component set 112. Both component sets communicate to one another using secure web service APIs (application programming interfaces) and/or XML (extended markup language) in order to transfer data and instructions ("calls") to one another. Both the use of web service APIs as the communication method and XML as the format for the communication between the component sets is illustrative and not intended to limit the scope of the invention.

The user side component set 111 comprises a user side server 120. The user side server 120 communicates with the system side server 130, contained by the system side component set 112, in the manner indicated above. The system side server 130 includes a web application framework in order to maintain the communications between both component sets. Any human review calls that are initiated by the user through the user side server 120 are first received by the system side server 130 and then passed along to the rest of the system side component set 112. Any information required by the user side server 120 in a human readable format is translated by system side dashboard unit 160. The system side dashboard unit receives all information for translation from the system side server 130 and then communicates it over to the user side server 120 after translation.

The system side server 130 is in communication with a relational database framework 131. The relational database framework 131 allows the system to generate relational database columns for the various required attributes that are required by the system in order to process a document set and manage the assisted review process. Furthermore, the relational database framework allows for the user side server 120 to directly access particular document elements that are processed into the system.

The relational database framework 131 also includes a task server 150. The task server 150 includes a task/queue framework 151, a messaging framework 152, a distributed file system parallel processing unit 153, and a topic-related generative model 154. The task/queue framework 151 and the messaging framework 152 are involved in managing the communications that occur between the elements within the system side component set 112. The distributed file system parallel processing unit 153 is involved in handling all tasks that are associated with the distributed file system 144. Finally, the topic-related generative model 154 is utilized by the distributed file system parallel processing unit 153 in order to process analytics and generate the document map within the distributed file system 144 (explained further in this document).

The system side server 130 and relational database framework 131 are also in communication with a storage server 140. The storage server 140 includes a storage medium 141 containing a relational database 142, a relational database management system 143, and a distributed file storage system 144. The relational database 142 is used by the system to store a plurality of imported and generated data. Such data includes the processed document set and the analytics attributed by the document set. The relational database management system 143 manages the relational database 142 over the course of the assisted review process. The storage server 140 also contains a distributed file storage system 144. The system currently implements an Apache™ Hadoop® distributed file system, but this is only exemplary because other file systems may be implemented in accordance with the invention. The distributed file storage system 144 is required in order to generate and update the document map that is used by the system during the assisted review process (the document map is explained further on in this document).

Document Review Method

Figure 2:
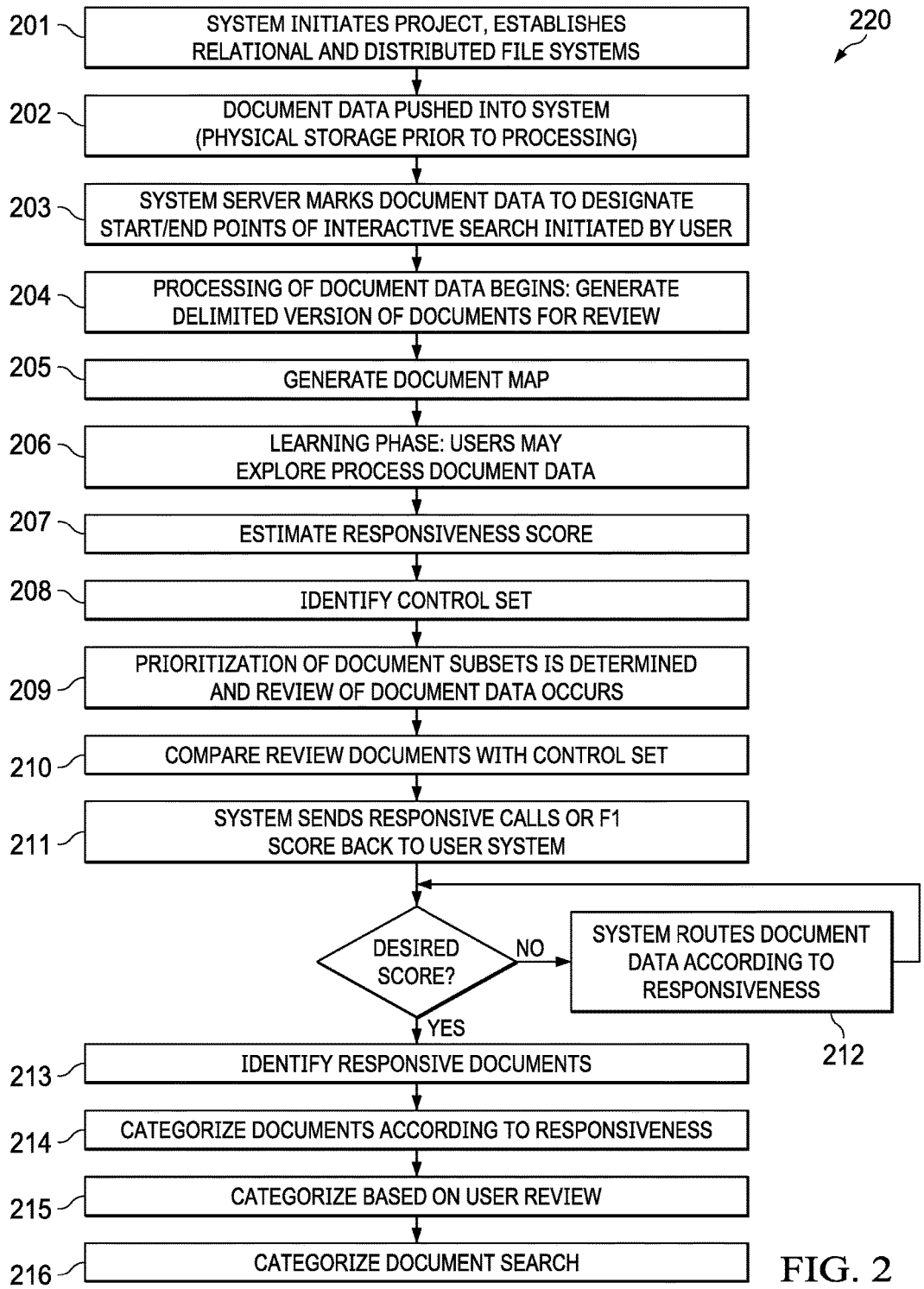
FIG. 2 is a diagram drawing of the method overview comprising the technology assisted document review process.

FIG. 2 shows a diagram drawing of the method 220 utilized to provide a technology assisted data review. Method 220 begins with step 201 wherein the system initiates a data review. This step requires the initialization of the relational database and the distributed file systems prior to importing and processing the document set for review. Within step 202 the document set is pushed into the system in order to initialize the review process. This step only includes the physical transfer of the document data into the system storage medium 142 prior to any processing performed by the system 110.

Step 203 involves the optional prioritization of document subsets as defined by the user of the system 110. The validation and processing of the document set for review occurs within step 204. The system 110 In order to prepare the document set for review, the system creates a delimited version of the document set and places it within the relational database 142. All analysis conducted through the assisted review is based on the processed document set.

At step 205, the system 110 generates a document map from the processed document set currently in the system. It is this document map that is then used by the system in order to estimate later responsive scores with user review calls and also later categorize documents.

Following the processing of the document set and generation of the document map, the system triggers a "learning phase" at step 206. During the learning phase, the system does not trigger any analytics and does not initiate the creation of the document map within the distributed file system 144. This phase is incorporated to allow all users time to understand the document set imported into the system prior to making searches and calls, which would generate analytics and possibly generate inaccurate review results.

Next, after completion of the learning phase at step 206, the system 110 will estimate a responsiveness score at step 207. This score will be based on the previous user review calls and search results.

Next, the control set of documents is identified within the system at step 208. A control set of documents is established by the system in order to compare the review actions of the users within the system in order to address the existence of any "false-positives". The nature of false-positives as they relate to the assisted review process will be fully explained below. One key aspect of the control set is that it contains at least two identified strata within the control set. These strata then go through random sampling in order to generate subsets that reside within both strata of the control set. Using later human responses to the documents within these strata helps the system develop a better understanding of which strata would contain documents with higher predictive responsiveness values.

Upon completion of the review process at step 209, the system 110 will compare the review documents with the control set at step 210. These comparisons will help the system compare its machine call document with the responses determined from the control and re-sort the document map. These attributes are stored within the relational database 142. Following this comparison, the system 110 will calculate an F1 score and forward it to the user at step 211. The entire process will repeat until the desired F1, or confidence, score is reached by the user as discussed below.

The system's accuracy is defined by recall and precision measurements. Recall is the percentage of truly relevant documents that are called as responsive. A high recall score means that few coded documents are false negatives, or documents that are called not responsive but actually are responsive. Precision is a measure of how accurate reviewers are in identifying responsive documents. A high precision score means that few coded documents are false positives, or documents that coded as responsive but actually are not responsive. The combination of the recall and precision measures is known as an F1 score. The F1 calculation formula is (2*(Recall*Precision))/(Recall+Precision). A high F1 score means fewer responsive documents are being missed, and that fewer non-responsive documents are being produced. It is based on this F1 score that a user can determine whether or not a document set has completed the assisted review process. As the document set reaches the appropriate F1 score, every document is also receiving a calculated responsiveness score. It is this document responsiveness score that allows for the separation of responsive documents within the document set at step 209.

If the system 110 is not producing the desired F1 score for a particular processed document set then additional documents are forwarded for user review at step 212. Once the desired F1 score is reached, the system 110 identifies the responsive documents within the database 142 at step 213. Next, at step 214, the system 110 then categorizes the documents according to their responsiveness. The system 110 then further categorizes the documents based on the user review calls already inputted into the system at step 215. Finally, the system categorizes a responsive document search for further user review at step 216.

Figure 3:
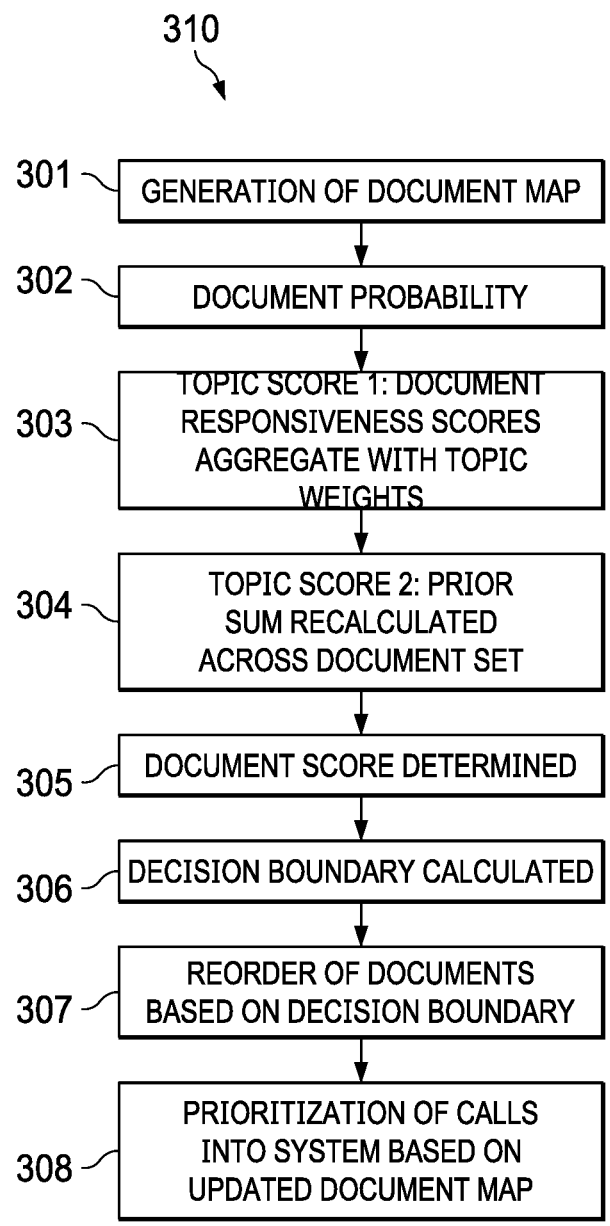
FIG. 3 is a diagram drawing of the review method within technology assisted document review process.

FIG. 3 is a diagram drawing of method 310 showing the assisted review process found within steps of FIG. 2. These encompass the particularized steps that reiterate multiple times on a processed document set until the required F1, or confidence, score is reached during a review. First, at step 301, the system builds a "document map" of documents and stores it within the distributed file system 144. Within a document map, documents with similar content are placed close together on the map. Specifically, the system utilizes the distributed filing system parallel processing unit 153 in conjunction with the topic-related generative model 154 to build a soft clustering of document into "topics" and based on this document-topic relation, the system infers which documents are the most similar. Documents that overlap on a similar topic set are "closer on the map" than documents that do not overlap on any topics, for example. The generative model utilized by this system is an open source implementation of the Latent Dirichlet Allocation algorithm. It should be understood that the use of this algorithm is merely illustrative and should not be viewed as a limitation of the invention.

Next, at step 302, the system runs a document probability on each of the documents within the document set. Given all of the human calls that have happened so far and the fact that these calls are potentially erroneous, the system 110 estimates the probability that a document is responsive given all of the human calls that have been made thus far. The system calculates the responsiveness of a particular topic (the topic score) within the document set by cascading the document responsiveness estimates up to each topic. This is a two step process. At step 303, the system first aggregates document responsiveness scores along with document-topic weights. Second, the system recalculates any particular topic-score based on any new aggregates from step 303 at step 304. The formula for this two step process is as follows:

$$(\text{topic score}) \; st = (\text{Summation of } wtd*Pd)/\text{Summation of } wtd$$

Wtd=Topic-document weight from the topic-related generative model 154 between topic t and document d.

Pd=document responsiveness probability based on reviewer and system generated calls.

At step 305, the individual document score for each document within the document set is calculated based on the revised topic score from steps 303 and 304. This involves aggregating the revised topic scores attached to each individual document and then "double dipping" on the document responsiveness probabilities generated during step 302. This involves two calculations: initial and final document scores.

The initial document score is represented by the equation below:

$$s0 = \text{Summation over } t(wtd*st)$$

The final document score is represented by the equation below:

$$sd=1/1+((1-s0)*(1-Pd)/s0*Pd)$$

This allows for the system to normalize the each document responsiveness probability in relation to any changes in the topic score from steps 303 and 304.

Next, the system determines a "decision boundary" at step 306 in order to draw a line between responsive and non-responsive documents. Without sufficient calls present in the system (i.e. during the first iteration of the review process), the system uses the median of the document scores as a decision boundary. Then, the system will reorder the documents at step 307 based on their mathematical "distance" from the decision boundary. This moves responsive documents closer together within the document map and non-responsive document farther away as well. Finally, the system will update all user and system call priorities at step 308 based on the document reorder. This will again optimize the decision boundary in conjunction with the F1 score will determine whether or not the review process is complete and which document are responsive as a result of the review.

While exemplary systems and methods in accordance with the invention have been described herein and in the accompanying materials, it should also be understood that the foregoing along with the accompanying materials are illustrative of a few particular embodiments as well as principles of the invention, and that various modifications can be made by those skilled in the art without departing from the scope and spirit of the invention. Therefore, the described embodiments should not be considered as limiting of the invention in any way. Accordingly, the invention embraces alternatives, modifications and variations which fall within the spirit and scope of the invention as set forth in the embodiments provided herein and in the accompanying materials, including equivalents thereto.

Those skilled in the art will also readily appreciate that systems and methods configured in accordance with the invention including the exemplary embodiment in the accompanying materials may include or employ various computer and network related software and hardware, such as software and hardware which are used in a distributed computing network, that is, programs, operating systems, memory storage devices, input/output devices, data processors, servers with communication links, wireless or otherwise, such as those which take the form of a local or wide area network, and a plurality of data terminals within the network, such as personal computers and mobile devices. Those skilled in the art will further appreciate that, so long as its users are provided with access to systems and methods constructed in accordance with the invention, specific types of network, software or hardware are not vital to its implementation.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database, in that any database may be used that enables the systems and methods described herein.

Some embodiments of the invention are also directed to a non-transitory machine readable media for providing methods as described herein, including one or more software programs, code and/or data segments as necessary to install or otherwise provide any of the methods described herein on one or more computing machines.

What is claimed is:

1. A data review system, comprising: a processor;
   a data store including a plurality of documents;
   a non-transitory computer readable medium, comprising instructions for:
   generating a document map for the plurality of documents within the data store using a topic-related generative model for the plurality of documents;
   selecting a control set of documents from the plurality of documents, wherein the control set of documents is selected from a first strata of the plurality of documents and a second strata of the plurality of documents;
   sending the control set of documents to a user;
   receiving a control set metric regarding the control set of documents from the user, wherein the control set metric includes an indicator of responsiveness for each of the documents of the control set of documents;
   the data review system performing the steps of:
   a) determining a responsiveness score for each of the plurality of documents based on a scoring algorithm;
   b) determining a set of responsive documents and a set of non-responsive documents of the plurality of documents based on the responsiveness score determined for each of the plurality of documents and a decision boundary score;
   c) determining a confidence score for the data review system using the responsiveness score for each of the documents of the control set and the indicator of responsiveness for each of the control set documents received from the user;
   d) selecting one or more of the plurality of documents based on the responsiveness scores of the plurality of documents, wherein the responsiveness score of each of the one or more selected documents is at or near the decision boundary score;
   e) presenting the one or more selected documents to the user;
   f) receiving an indicator of responsiveness from the user for each of the selected documents;
   g) refining the scoring algorithm based on the indicator of responsiveness for each of the selected document; and
   h) generating a desired confidence score for the data review system and presenting the set of responsive documents to the user when the desired confidence score for the data review system is achieved, wherein the confidence score for the data review system is an F1 score determined by comparing the responsiveness score for the documents of the control set to the indicator of responsiveness for the documents of the control set received from the user.

2. The system of claim 1, wherein the instructions are further configured for estimating an initial responsiveness score of the plurality of documents and the control set of documents are generated based on the initial responsiveness score.

3. The system of claim 2, wherein the first strata of the plurality of documents includes non-responsive documents with an initial responsiveness score below the decision boundary and the second strata of the plurality of documents includes responsive documents with an initial responsiveness score above the decision boundary.

4. The system of claim 3, wherein the first strata is randomly selected from documents with the initial responsiveness score below the decision boundary and the second strata is randomly selected from documents with the initial responsiveness score above the decision boundary.

5. The system of claim 3, wherein the initial responsiveness score was generated based on user interaction with the plurality of documents.

6. The system of claim 5, wherein the user interaction includes a keyword search of the plurality of documents.

7. The system of claim 1, wherein generating a desired confidence score for the data review system comprises:
repeating steps a-g until the determined confidence score for the data review system is the desired confidence score for the data review system.

8. A method, comprising:
building a document map for a plurality of documents within a data store of a document system using a topic-related generative model for the plurality of documents;
selecting a control set of documents from the plurality of documents, wherein the control set of documents is selected from a first strata of the plurality of documents and a second strata of the plurality of documents;
sending the control set of documents to a user;
receiving a control set metric regarding the control set of documents from the user, wherein the control set metric includes an indicator of responsiveness for each of the documents of the control set of documents;
performing, by the document system, the steps of:
a) determining a responsiveness score for each of the plurality of documents based on a scoring algorithm;
b) determining a set of responsive documents and a set of non-responsive documents of the plurality of documents based on the responsiveness score determined for each of the plurality of documents and a decision boundary score;
c) determining a confidence score for the document system using the responsiveness score for each of the documents of the control set and the indicator of responsiveness for each of the control set documents received from the user;
d) selecting one or more of the plurality of documents based on the responsiveness scores of the plurality of documents, wherein the
responsiveness score of each of the one or more selected documents is at or near the decision boundary score;
e) presenting the one or more selected documents to the user;
f) receiving an indicator of responsiveness from the user for each of the selected documents;
g) refining the scoring algorithm based on the indicator of responsiveness for each of the selected document; and
h) generating a desired confidence score for the document system, and presenting the set of responsive documents to the user when the desired confidence score for the document system is achieved, wherein the confidence score for the document system is an F1 score determined by comparing the responsiveness score for the documents of the control set to the indicator of responsiveness for the documents of the control set received from the user.

9. The method of claim 8, further comprising estimating an initial responsiveness score of the plurality of documents and the control set of documents are generated based on the initial responsiveness score.

10. The method of claim 9, wherein the first strata of the plurality of documents includes non-responsive documents with an initial responsiveness score below the decision boundary and the second strata of the plurality of documents includes responsive documents with an initial responsiveness score above the decision boundary.

11. The method of claim 10, wherein the first strata is randomly selected from documents with the initial responsiveness score below the decision boundary and the second strata is randomly selected from documents with the initial responsiveness score above the decision boundary.

12. The method of claim 10, wherein the initial responsiveness score was generated based on user interaction with the plurality of documents.

13. The method of claim 12, wherein the user interaction includes a keyword search of the plurality of documents.

14. The method of claim 8, wherein generating a desired confidence score for the document system comprises:
repeating steps a-g until the determined confidence score for the document system is the desired confidence score for the document system.

15. A non-transitory computer readable medium, comprising instructions for:
building a document map for a plurality of documents within a data store of a document system using a topic-related generative model for the plurality of documents;
selecting a control set of documents from the plurality of documents, wherein the control set of documents is selected from a first strata of the plurality of documents and a second strata of the plurality of documents;
sending the control set of documents to a user;
receiving a control set metric regarding the control set of documents from the user, wherein the control set metric includes an indicator of responsiveness for each of the documents of the control set of documents;
the document system performing the steps of:
a) determining a responsiveness score for each of the plurality of documents based on a scoring algorithm;
b) determining a set of responsive documents and a set of non-responsive documents of the plurality of documents based on the responsiveness score determined for each of the plurality of documents and a decision boundary score;
c) determining a confidence score for the document system using the responsiveness score for each of the documents of the control set and the indicator of responsiveness for each of the control set documents received from the user;
d) selecting one or more of the plurality of documents based on the responsiveness scores of the plurality of documents, wherein the responsiveness score of each of the one or more selected documents is at or near the decision boundary score;
e) presenting the one or more selected documents to the user;
f) receiving an indicator of responsiveness from the user for each of the selected documents;
g) refining the scoring algorithm based on the indicator of responsiveness for each of the selected document; and
h) generating a desired confidence score for the document system, and presenting the set of responsive documents to the user when the desired confidence score for the document system is achieved, wherein the confidence score for the document system is an F1 score determined by comparing the responsiveness score for the documents of the control set to the indicator of responsiveness for the documents of the control set received from the user.

16. The non-transitory computer readable medium of claim 15, further comprising estimating an initial responsiveness score of the plurality of documents and the control set of documents are generated based on the initial responsiveness score.

17. The non-transitory computer readable medium of claim 16, wherein the first strata of the plurality of documents includes non-responsive documents with an initial responsiveness score below the decision boundary and the second strata of the plurality of documents includes responsive documents with an initial responsiveness score above the decision boundary.

18. The non-transitory computer readable medium of claim 17, wherein the first strata is randomly selected from documents with the initial responsiveness score below the decision boundary and the second strata is randomly selected from documents with the initial responsiveness score above the decision boundary.

19. The non-transitory computer readable medium of claim 17, wherein the initial responsiveness score was generated based on user interaction with the plurality of documents.

20. The non-transitory computer readable medium of claim 19, wherein the user interaction includes a keyword search of the plurality of documents.

21. The non-transitory computer readable medium of claim 15, wherein generating a desired confidence score for the document system comprises:

repeating steps a-g until the determined confidence score for the document system is the desired confidence score for the document system.

* * * * *